(12) United States Patent
Geller et al.

(10) Patent No.: US 9,262,527 B2
(45) Date of Patent: Feb. 16, 2016

(54) OPTIMIZED ONTOLOGY BASED INTERNET SEARCH SYSTEMS AND METHODS

(75) Inventors: James Geller, West Orange, NJ (US); Christopher Ochs, Ocean Grove, NJ (US)

(73) Assignee: NEW JERSEY INSTITUTE OF TECHNOLOGY, Newark, NJ (US)

( * ) Notice: Subject to any disclaimer, the term of this patent is extended or adjusted under 35 U.S.C. 154(b) by 499 days.

(21) Appl. No.: 13/530,456

(22) Filed: Jun. 22, 2012

(65) Prior Publication Data

US 2013/0013580 A1  Jan. 10, 2013

Related U.S. Application Data

(60) Provisional application No. 61/499,818, filed on Jun. 22, 2011.

(51) Int. Cl.
*G06F 7/00* (2006.01)
*G06F 17/30* (2006.01)

(52) U.S. Cl.
CPC .... *G06F 17/30864* (2013.01); *G06F 17/30672* (2013.01)

(58) Field of Classification Search
CPC ............... G06F 17/30734; G06F 17/30672
USPC ................................................ 707/731, 739
See application file for complete search history.

(56) References Cited

U.S. PATENT DOCUMENTS

| | | | |
|---|---|---|---|
| 5,754,938 A * | 5/1998 | Herz et al. | 725/116 |
| 6,038,560 A * | 3/2000 | Wical | |
| 6,424,973 B1 * | 7/2002 | Baclawski | |
| 6,460,036 B1 * | 10/2002 | Herz | 707/748 |
| 6,675,159 B1 * | 1/2004 | Lin et al. | |
| 8,041,702 B2 * | 10/2011 | Eggebraaten et al. | 707/708 |
| 2002/0052894 A1 * | 5/2002 | Bourdoncle et al. | 707/513 |
| 2003/0037041 A1 * | 2/2003 | Hertz | 707/1 |
| 2003/0177112 A1 * | 9/2003 | Gardner | 707/3 |
| 2004/0103090 A1 * | 5/2004 | Dogl et al. | 707/3 |
| 2006/0036633 A1 * | 2/2006 | Chong et al. | 707/101 |
| 2006/0053151 A1 * | 3/2006 | Gardner et al. | 707/102 |
| 2006/0074980 A1 * | 4/2006 | Sarkar | 707/104.1 |

OTHER PUBLICATIONS

T. Tian, J. Geller, S. A. Chun, "Improving Web search results for homonyms by suggesting completions from an ontology", in ICWE'10 Proceedings of the 10th International Conference on Current Trends in Web Engineering, Vienna, Austria, pp. 175-186, 2010.*

Tian et al, Advanced Information Systems Engineering Workshops vol. 83 of the series Lecture Notes in Business Information Processing pp. 544-553, 2011.*

(Continued)

*Primary Examiner* — Cheyne D Ly
(74) *Attorney, Agent, or Firm* — Timothy X. Gibson, Esq.; Gibson & Dernier LLP

(57) ABSTRACT

Methods and apparatus for providing suggested completions to search results are disclosed which employ locating nodes in a stored ontology, wherein nodes consist of classes or instances of information, that correspond to the at least one search term, retrieving neighbors of located nodes in the stored ontology, and generating suggested completions in a format which separates homonymic terms. Methods and apparatus are disclosed for building ontologies and dynamically expanding ontologies.

12 Claims, 9 Drawing Sheets

(56) References Cited

OTHER PUBLICATIONS

Ochs et al., 2011 Fifth IEEE International Conference on Semantic Computing, pp. 320-327.*

Radev, D.R., Fan, W., Zhang, Z.: WebInEssence: A Personalized Web-Based Multi-Document Summarization and Recommendation Syatem. In: NAACL Workshop on Automatic Summarization. Pittsburgh, PA (2001) pp. 1-10.

An, Y., Chun, S., Huang, K., Geller, J: Enriching Ontology for Deep Web Search. In: DEXA, vol. 5181, pp. 73-80. Lecture Notes in Computer Science. Turin, Italy (2008).

Google Query Suggestion, http://www.google.com/support/websearch/bin/answer.py?hl=en&answer=106230, Apr. 2013.

Yahoo Search Assistant, http://tools.search.yahoo.com/newsearch/searchassist.html, Apr. 2013.

An, Y., Geller, J., Wu, Y., Chun, S: Semantic Deep Web: Automatic Attribute Extraction from the Deep Web Data Sources. In: Proceedings of the 2007 ACM Symposium on Applied computing, pp. 1667-1672. SAC '07 Mar. 11-15, 2007, Seoul, Korea.

An, Y., Chun, S., Huang, K., Geller, J.: Assessment for Ontology-Supported Deep Web Search. In: 2008 10th IEEE Conference on E-Commerce Technology and the Fifth IEEE Conference on Enterprise Computing, E-Commerce and E-Services, pp. 382-388. IEEE Computer Society (2008).

Tian, T., Geller, J., Chun, S.A.: Predicting Web Search Hit Counts. 2010 IEEE/WIC/ACM International Conference on Web Intelligence and Intelligent Agent Technology, Toronto, Canada, pp. 162-166 (2010).

Lee, T.B., Hendler, J., Lassila, O.: The Semantic Web. In: Scientific American.com Magazine. (May 17, 2001).

Ding, L., Finin, T., Joshi, A., Pan, R., Cost, R.S.: Swoogle: A Search and Metadata Engine. In: Proceedings of the thirteenth ACM international conference on Information and knowledge management, pp. 652-659. ACM Press (2004).

Ontology Design Patterns (ODP), http://ontologydesignpatterns.org/wiki/Main_Page (May 29, 2012).

The Open Biological and Biomedical Ontologies (OBO), http://www.obofoundry.org/ (Apr. 26, 2013).

Niles, L., Pease, A.: Towards a standard upper ontology. In: Proceedings of the international conference on Formal Ontology in Information Systems, FOIS'OI, Oct. 17-19, 2001, Ogunquit, Maine, USA., pp. 2-9.

Sowa, J.F.: Knowledge Representation: Logical, Philosophical, and Computational Foundations. Brooks Cole Publishing Co., p. 95-96, Pacific Grove, CA (2000).

* cited by examiner

Ontology-Supported Web Search

| |
|---|
| martina |
| martina hingis tennis player |
| martina hingis born on september 30 |
| martina hingis born in slovakia |
| martina navratilova tennis player |
| martina navratilova born on october 18 |
| martina navratilova born in prague czechoslovakia |
| martina mcbride singer |
| martina mcbride music country |
| martina mcbride music adult contemporary |
| martina mcbride music country pop |
| martina mcbride birth name martina mariea schiff |
| martina mcbride born on 1966 7 |
| Google Search        I'm Feeling Lucky |

FIG. 4

Ontology-Supported Web Search

| |
|---|
| michael jackson |
| michael jackson singer |
| michael jackson music pop |
| michael jackson music soul |
| michael jackson music dance |
| michael jackson music rock |
| michael jackson basketball player |
| michael jackson sacramento kings |
| michael jackson national basketball association (nba) |
| michael jackson born on july 13 |
| michael jackson football player |
| michael jackson born on 4 december |
| michael jackson born in runcorn england |
| Google Search        I'm Feeling Lucky |

FIG. 5

OPTIMIZED ONTOLOGY BASED INTERNET SEARCH SYSTEMS AND METHODS

CROSS-REFERENCE TO RELATED APPLICATIONS

This application claims the benefit of U.S. Provisional Patent Application No. 61/499,818 filed Jun. 22, 2011, the entirety of which is incorporated herein by reference.

FIELD OF THE INVENTION

The present invention relates to the field of internet searching, more specifically to the field of improving search results using internet search engines.

BACKGROUND OF THE INVENTION

Information needs of users in the digital era can be fulfilled by keyword-based search engines. Such search engines have become the universal catalogs for world-wide resources. Unlike the old library catalogs that are mostly searchable by fixed fields (e.g., by authors, titles, and keywords predefined by authors), modern Web search engines provide a flexible, easy way to express search terms. However, the search results are typically long lists of hits that contain many irrelevant links. Radev, D. R., et al., WebInEssence: A Personalized Web-Based Multi-Document Summarization and Recommendation System. In: NAACL Workshop on Automatic Summarization. Pittsburgh, Pa. (2001).

Past research has concentrated either on refining the search keywords or on sifting and filtering the search results, to improve the precision of the returned hit lists. Search engines face an additional complication when a search term is a homonym (a keyword with multiple meanings or multiple references) and the user is not aware that there are several concepts for this term. She might not be aware of this homonymy at all, or it might escape her attention at the moment of performing the Web search. For example, when looking for information about former President George W. Bush she might momentarily forget about President George H. W. Bush, the father of President George W. Bush. She would then get results about both of them, which is not what she desired.

When using a search engine to satisfy an information need about a homonymous concept, a user is faced with two kinds of problems. She might get an overwhelming number of responses about one homonym, especially if this meaning is more popular, while the second homonym with a less popular meaning that she might be really interested in is hidden in a snippet on a much later page of hits returned by the search engine. This is the case with lopsided preferences in meanings. For instance, the "Michael Jackson" who is a singer is much more popular than the basketball player of the same name. Hence many more search results contain references to the singer. In this situation, the user is at least aware that the results she is getting are not about the basketball player that she has been looking for. When formulating the initial query, it escaped her attention that there are two concepts for her search term and that more information might be available on the Web about the homonym that she is not interested in. At this point, she needs to wade through pages of reported hits for the wrong Michael Jackson or append terms to her query that will exclude the unwanted homonym and re-execute the search. This constitutes a kind of feedback loop between the user and the search engine.

The situation is even worse if the user is completely unaware of the fact that the search term is a homonym with two (or more) references, and all results that appear on the first few pages of hits are to the "wrong" reference. For example, a user located in the New York area, who types "Penn Station" into Google® will see many references to Penn Station in New York City (NYC) and some references to Penn Station in Newark. These two Penn Stations are separated by a 20 minute train ride. Unbeknownst to her, there is also a Penn Station in Philadelphia, Pa. However, a reference to the latter does not appear on the first page of search results.

In a previous ontology-supported Web search systems, the user was presented with a number of choices of additional search terms for her input. She could mark such terms as positive, i.e., they should be included in the Web search results, by clicking on associated check boxes. One problem with this approach was that users did not want to be bothered by many questions. A more benign approach to eliciting additional information from a user can be seen in the use of suggested completions. While a user types in the first (few) word(s) of her search, the search engine displays up to ten suggested search completions, which will possibly describe the search that the user had in mind. These completions are presumably based on the observed frequencies of many searches of other search engine users. While the user continues to type, the suggested completions change rapidly and are often limited to fewer than ten.

Another weakness of the aforementioned Web search system was that it did not make use of the information that may be inferred by a form of closed-world assumption from the terms that the user did not select with a check mark. According to the documentation of major search engines, the use of negative search words, marked with a minus sign before the word(s), constitutes a particularly powerful tool for discriminating between different results.

Current popular search engines do not reflect distinctions between different concepts that are expressed by the same word or the same multi-word term (homonyms). Suggested completions also do not appear to be optimized for discrimination between homonyms. These suggested completions are disorganized from a conceptual point of view.

SUMMARY OF THE INVENTION

Methods, systems and apparatus are disclosed herein employing ontologies for improving the mechanism of suggested search completions. An ontology is a knowledge representation that consists of concepts, organized in a hierarchy of IS-A links that establish the generality and specificity relationships of those concepts. Additional information is attached to these concepts in the form of attributes, which describe simple local knowledge about a concept and semantic relationships. A semantic relationship connects one concept to another concept by a link expressing a real world relationship that holds between those concepts and that is different from the IS-A relationship.

In accordance with one aspect of the disclosed subject matter, ontologies, which contain the knowledge of the classes to which terms belong, are used so that displays of suggested search term completions are categorized visually to make clear that homonymous terms exist. In many cases this will allow the user to discover senses of a search term that he/she was not previously aware of. This method also successfully deals with the problem of "search shadowing." Thus, for example, if a user wants to find out information about the AI researcher Michael Jackson, on existing search engines a search for "Michael Jackson" would bring up only pages for the singer. Thus, the singer in effect shadows the AI researcher. The disclosed method of making different homonyms, in this case different Michael Jacksons, explicit overcomes this shadowing effect.

Thus, in accordance with one aspect a method is disclosed for providing suggested completions to search results, including the steps of receiving at a server at least one search term, locating nodes in a stored ontology, wherein nodes consist of classes or instances of information, that correspond to at least one search term, wherein, when two or more nodes are located in the stored ontology that match at least one search term, for each located node, retrieving neighbors or extended neighbors of the two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationships and wherein extended neighbors of an instance are classes which are reachable as parent or ancestors from the class to which the instance belongs, class properties and data type properties of the class to which the instance belongs; and wherein when the node is a class, retrieving first a parent or ancestor; when the node is an instance, retrieving first the class of which it is an instance or at least one of its ancestors; optionally, limiting the retrieved information to a subset; and generating suggested completions in a format using at least one separator that may be presented to a user.

The step of optionally limiting the retrieved information to a subset may include eliminating neighbors that are common to more than one sense of a search term.

In one aspect a suggested completion may be provided using information of the node when only a single node is located.

In another aspect the format of suggested completions may include separating different homonymic terms visibly using at least one or more visually distinguishing features, such as but not limited to by using horizontal or vertical, lines, zig-zag lines, dashes, dots, and/or background colors, etc.

In yet a further aspect the method may include showing a maximum number of suggestions that is considered not overwhelming for human users, such as six (6) to (18), for a maximum number of homonymic terms that are not overwhelming for human users, such as two (2) to six (6). In one embodiment the maximum number of suggestions is twelve (12) for a maximum number of four (4) homonymic terms. In yet a further aspect, the present invention may include a step of employing selection criteria to limit the number of homonymic terms to four. In one aspect a selection criteria may be hit count estimates obtained or obtainable from a search engine.

In a still further aspect, the method may include using neighbors of a node that are used as positive search terms for one homonymic term as a negative search terms for another homonymic term. Recognizing that the use of too many negative search terms might exclude relevant results, in a further aspect, in order to prevent suggested search completions from being over-specified to the point that the search engine would return no or too few results, methods are provided which employ ontologies both for creating suggested completions and for providing the knowledge needed to visually categorize them. In this regard, the presently disclosed subject matter employs negative search terms in addition to "positive" search terms. Appending well chosen negative search words to a search term given by the user results in improved discrimination between homonyms of that search term, if the appended words are characteristic for one of the homonymic senses. When two (or more) homonymic search terms are available, then the attributes and relationships of the two corresponding concepts are retrieved from the underlying ontology. Every attribute or relationship target which is in common between the two concepts is eliminated, as it is noise for the purpose of the search. The attributes that differ and the relationships that have differing targets are used as mutual negative search terms. Thus, a relationship target from the ontology is used as positive search term for one homonym and as a negative search term for the other homonym. This process is symmetrical so that each positive search term for one homonym becomes a negative search term for the other homonym(s). The negative search terms so generated are proposed to the user as suggested continuations and lead to improved precision of the search results. In one aspect the method of performing a search employs the Google API, which supports negative search terms.

In accordance with another aspect, ontologies are used to increase the precision of results, by making the suggested completions as discriminating as possible.

Methods are also disclosed for building an ontology which includes mining suggested completions from a search engine and extracting additional information from a database such as DBpedia (DBpedia, http://dbpedia.org/About, retrieved Apr. 20, 2011). One such disclosed method includes the steps of querying a search engine with common terms, extracting at least one term of interest from results generated by the search engine; assigning the at least one term of interest to a top value category; querying a separate database with the at least one term; saving type and relationship data for term(s) found in the separate database; removing all terms not correlated to the selected term type; creating mappings for disambiguation tags; assigning terms to an ontology type, analyzing the types of relationships for each type, and retaining the most common relationships for each type.

Thus, the methods disclosed herein may also include using an ontology built according to the foregoing steps.

In accordance with yet a further aspect, apparatus are disclosed, including a processor operating to perform actions in response to executing computer program instructions, the actions including providing suggested completions to search results, including the steps of receiving at a server at least one search term, locating nodes in a stored ontology, wherein nodes consist of classes or instances of information, that correspond to the at least one search term, wherein, when two or more nodes are located in the stored ontology that match the at least one search term, for each located node, retrieving neighbors or extended neighbors of the two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationship and wherein extended neighbors of an instance are classes which are reachable as parent or ancestors from the class to which the instance belongs, class properties and data type properties of the class to which the instance belongs; and wherein when the node is a class, retrieving first a parent or ancestor; when the node is an instance, retrieving first the class of which it is an instance or at least one of its ancestors;

optionally, limiting the retrieved information to a subset; and generating suggested completions in a format using at least one separator that may be presented to a user. The apparatus may use neighbors of a node that are used as positive search terms for one homonymic term as a negative search terms for another homonymic term.

In a still further aspect, the apparatus may use an ontology built according to the steps of querying a search engine with common terms, extracting at least one term of interest from results generated by the search engine; assigning the at least one term of interest to a top value category; querying a separate database with the at least one term; saving type and relationship data for term(s) found in the separate database; removing all terms not correlated to the selected term type; creating mappings for disambiguation tags; assigning terms to an ontology type, analyzing the types of relationships for each type, and retaining the most common relationships for each type.

In a further aspect, the present invention includes a non-transitory, computer readable storage medium containing a computer program, which when executed by a computer processor causes the computer processor to perform actions, the actions including providing suggested completions to search results, including the steps of receiving at a server at least one search term, locating nodes in a stored ontology, wherein nodes consist of classes or instances of information, that correspond to the at least one search term, wherein, when two or more nodes are located in the stored ontology that match the at least one search term, for each located node, retrieving neighbors or extended neighbors of the two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationship and wherein extended neighbors of an instance are classes which are reachable as parent or ancestors from the class to which the instance belongs, class properties and data type properties of the class to which the instance belongs; and wherein when the node is a class, retrieving first a parent or ancestor; when the node is an instance, retrieving first the class of which it is an instance or at least one of its ancestors; optionally, limiting the retrieved information to a subset; and generating suggested completions in a format using at least one separator that may be presented to a user. The apparatus may use neighbors of a node that are used as positive search terms for one homonymic term as a negative search terms for another homonymic term.

In a further aspect, the non-transitory, computer readable storage medium described above containing a computer program, which when executed by a computer processor causes the computer processor to perform actions, which may include using neighbors of a node that are used as positive search terms for one homonymic term as a negative search terms for another homonymic term.

In another aspect, the non-transitory, computer readable storage medium containing a computer program, which when executed by a computer processor causes the computer processor to perform actions, may use an ontology built according to the steps of querying a search engine with common terms, extracting at least one term of interest from results generated by the search engine; assigning the at least one term of interest to a top value category; querying a separate database with the at least one term; saving type and relationship data for term(s) found in the separate database; removing all terms not correlated to the selected term type; creating mappings for disambiguation tags; assigning terms to an ontology type, analyzing the types of relationships for each type, and retaining the most common relationships for each type.

In yet a further aspect, a method is disclosed for dynamically expanding an ontology including the steps of receiving a name or fragment thereof by a server running an ontology supported web search, processing the name including passing the name to a search engine which provides suggested search queries and retrieves the suggested search queries, and checking the suggested completions generated by the search engine for valid names; querying a second database to determine whether any of the names correlate to an actual person; when a name correlates to an actual person, determining whether the person already exists in the ontology; if the person does not exist in the ontology, determining the correct class and creating a new instance of the class in the ontology; wherein if the instance exists in the ontology, but only as a stub, promoted the stub to a full instance; querying the second database for applicable relationships and targets; creating a new instance for a target before including the relationship if a target does not exist in the ontology; adding the instance to a list of valid suggestions after the instance has been created within the ontology; and generating the list of valid suggestions.

In further aspects, the invention includes apparatus including a processor operating to perform actions in response to executing computer program instructions, the actions including the steps described above for expanding an ontology dynamically.

The invention includes in yet a further aspect a non-transitory, computer readable storage medium containing a computer program, which when executed by a computer processor causes the computer processor to perform actions, the actions including expanding an ontology dynamically as described in the above method.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 4 is a graphical representation of an example of a user interface displaying suggested search term completions according to one or more further aspects of the present invention;

FIG. 5 is a graphical representation of an example of a user interface displaying suggested search term completions according to one or more further aspects of the present invention;

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
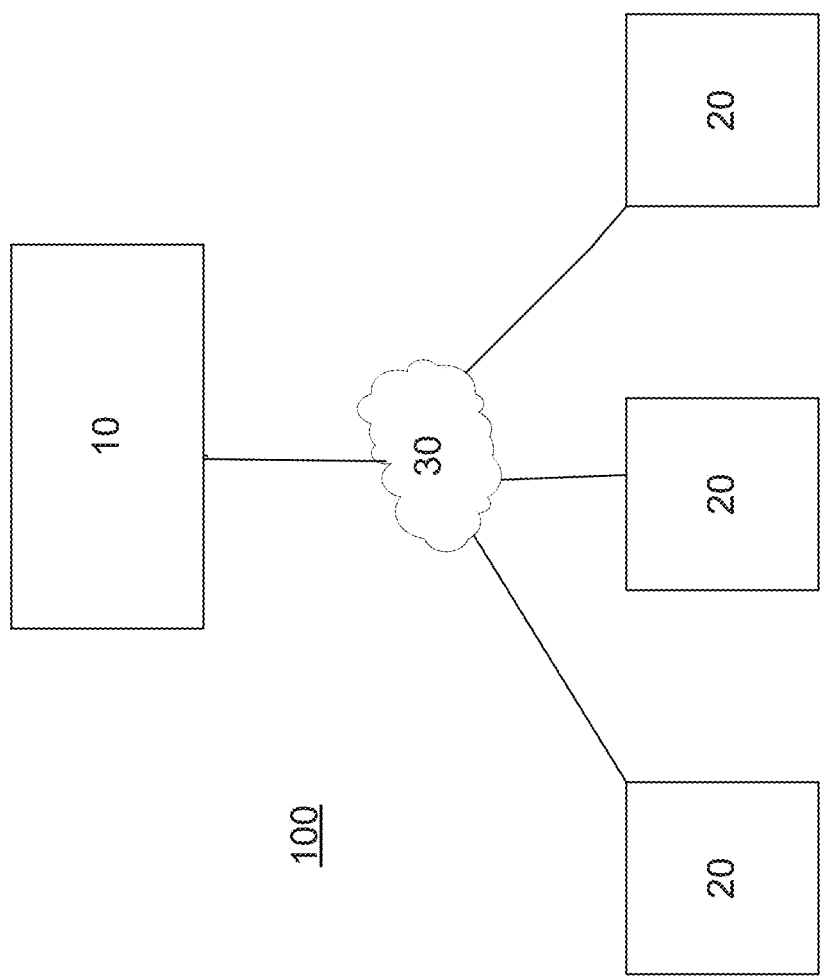
FIG. 1 is a block diagram of a network system suitable for carrying out suggested search term completions in accordance with one or more embodiments of the present invention.

With reference to the drawings, wherein like numerals indicate like elements, there is shown in FIG. 1 a block diagram illustrating an example of a system 100 for improving the mechanism of suggested search completions.

The system 100 preferably includes at least one server 10 coupled to one or more user computers 20 over a network 30, such as the Internet. The server 10 and user computers are operable to carry out computing activity (e.g., the execution of suitable software code) in connection with implementing the functions and actions of the system 100 disclosed and described herein.

By way of example, the server 10 and/or the user computers 20 may be implemented using know hardware, firmware, and/or software, as well as specialized software for carrying out specific functions and actions desirable for implementing embodiments of the invention. For example, with reference to FIG. 2, the server 10 and/or the user computers 20 may include a computer 101, which includes a data processing unit (or processor) 102 and a memory 104 operatively coupled by way of a data and/or instruction bus 106. The processor 102 may be implemented utilizing any of the known hardware, such as a digital microprocessor, a computer (such as a portable, a stationary and/or a distributed computing system), or any of the other known and/or hereinafter developed data processing units. The memory 104 may be implemented by way of separate hardware or may be disposed within the data processing unit 102, and any of the known hardware and/or software for implementing the memory function may be employed.

Data are preferably input to, and output from, the data processing unit 102 by way of an input/output device (or I/O interface) 108. Operators of the system 100 may desire to input software programs and/or data into the computer 101 by way of an external memory 110 that is coupled to the I/O interface 108 by way of a suitable link (such as a cable, wireless link, etc.) The external memory 110 may be implemented via a flash-drive, disc, remotely located memory device, etc.

The server 10 and/or the user computers 20 may also include an interface device 111, which is operatively coupled to the I/O interface 108 of the computer 101 via a suitable link, such as a cable, wireless link, etc. The interface device 111 includes at least one display 112, as well as an input device 114, such as a keyboard, mouse, voice recognition system, etc. The operators of the system 100, such as an IT professional (on the server 10 end) or a researcher (on the user computer 20 end), preferably utilizes the interface device 111 to provide information to the computer 101 in connection with entering appropriate data and/or programs into the system 100.

The computer 101 manipulates data via suitable software code in accordance with various embodiments of the invention and may display results on the display 112 for consideration by the various operators (IT professionals, users, etc.). In accordance with well-known techniques, the results may also be stored within the memory 104 of the computer 101, output and saved on the external memory device 110, and/or provided in any of a number of other ways.

Figure 2:
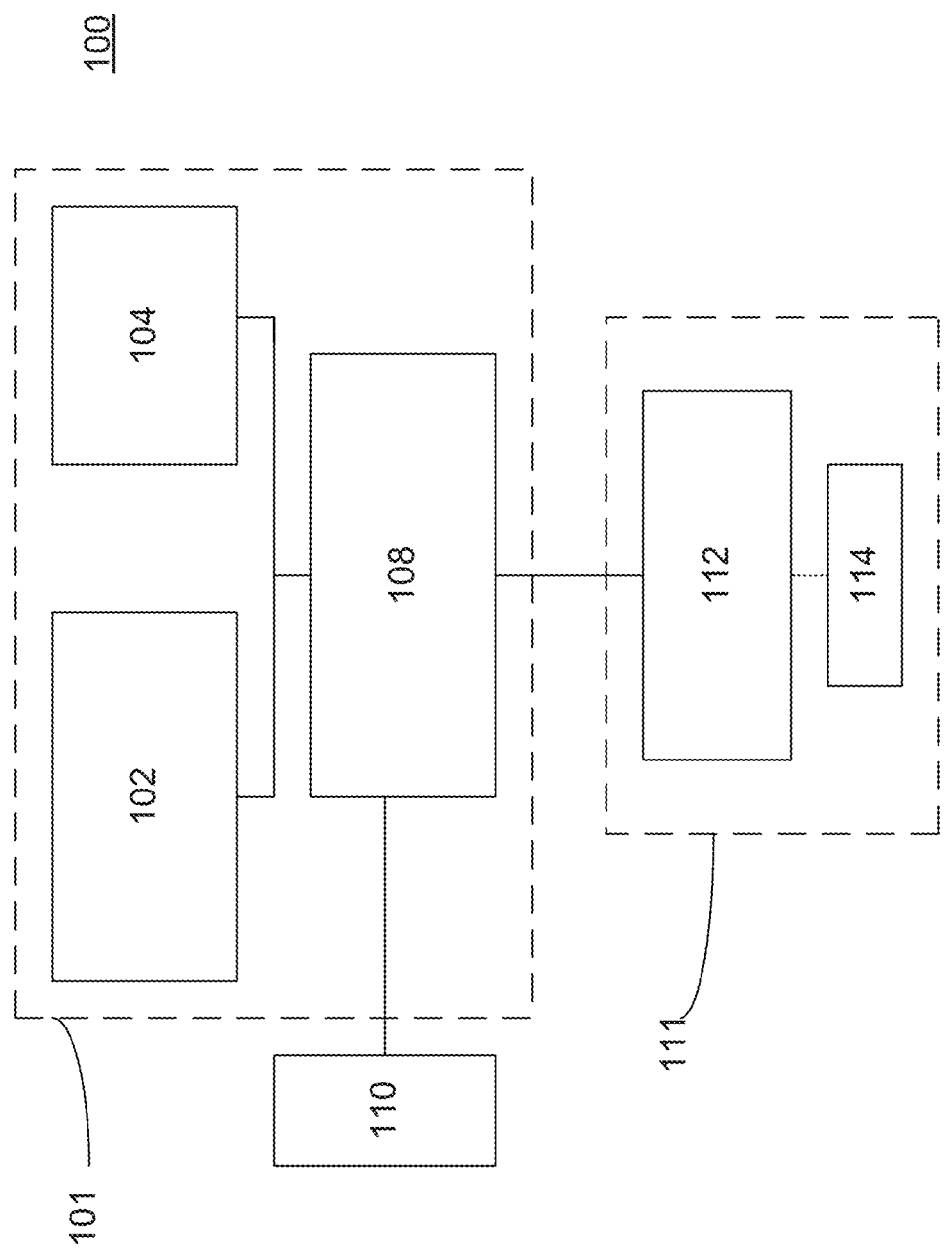
FIG. 2 is a block diagram of a computing system suitable for carrying out suggested search term completions in accordance with one or more embodiments of the present invention.

It is noted that the functional blocks illustrated in FIGS. 1-2 may be partitioned as shown or may be partitioned in any other way, such as in an integral fashion. By way of example, the system 100 may be implemented utilizing a portable, stationary, or distributed computer operating under one or more suitable computer programs. Further, one or more of the functional blocks of the system 100 may be remotely located from the others, such as in a distributed (e.g., networked) system.

Irrespective of how the system 100 is implemented and/or partitioned, it preferably carries out one or more methods for improving suggested search completions.

Generating suggested completions with positive search terms can be carried out as known in the art. In one embodiment the step of generating suggested completions in accordance with the disclosed subject matter is similar to that disclosed in An, Y. et al., Enriching Ontology for Deep Web Search, DEXA, vol. 5181, pp 73-80. Lecture Notes in Computer Science, Turin, Italy (2008).

Figure 3:
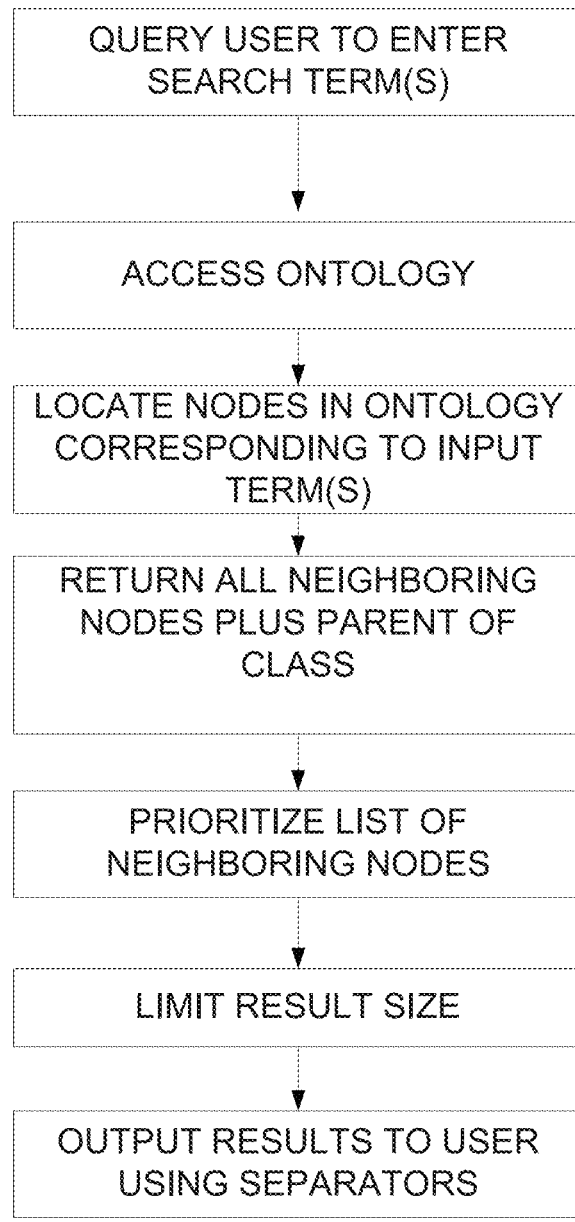
FIG. 3 is a flow diagram indicating certain process steps that may be carried out in accordance with one or more further aspects of the present invention.

Referring now to FIG. 3, in accordance with one embodiment, in practice a system is provided which may prompt a user to enter search terms in a user interface provided by the server. The terms are received at a server such that the algorithm locates nodes (classes or instances) in the stored ontologies that correspond to the input words. If only one node is located, then there is no problem with homonymy, at least according to the knowledge incorporated in the set of all loaded ontologies. Alternatively, if two (or more) nodes are located in the ontologies that match the user input, then additional processing is performed.

For each located node, its immediate neighbors or extended neighbors in the ontology network are retrieved, starting with the parent(s) or ancestor(s), if it is a class, or if it is an instance, the class of which it is an instance or its parent or ancestor(s). For purposes of this embodiment, the immediate neighbors of a class are the following: parent classes (more general), child classes (more specific) and classes that are reachable from it by traversing a "semantic relationship". The immediate neighbors of an instance are the class which the instance belongs to, and the object properties and the data type properties of the instance. For the purpose of this embodiment, the extended neighbors of a class are the following: ancestor classes (more general), descendant classes (more specific) and classes that are reachable from it by traversing a path of two or more "semantic relationships." The extended neighbors of an instances are the parents or ancestors of the class which the instance belongs to, and the object properties and the data type properties of the class it belongs to. Neighbors that are common to more than one sense (meaning) of the search term are eliminated, as they have no discriminatory power. The algorithm appends subsets of these retrieved terms to the user terms to generate several suggested completions.

Knowledge from different domains may be assumed to be stored in separate ontologies. However, when using this implemented knowledge, all ontologies are considered connected and combined into a single knowledge base.

The following is an exemplary system utilizing one embodiment of the present invention:

The system prompts a user to type in terms. For purposes of illustration, in this example the user types in two words A B, for example A=Michael and B=Jackson.

The system identifies two concepts referred to as A B, identified as AB1 and AB2.

AB1 is an instance of K. AB1 has a neighbor L.

AB2 is an instance of M. AB2 has a neighbor N. The concepts K, L, M and N are distinct.

The search engine generates the following suggested completions, three for AB1 and three for AB2: A B K; A B L; A B K L; A B M; A B N; and A B M N.

The total number of suggested completions is limited by a threshold and controlled by strict priorities in which order to select neighbors.

The suggested completions are presented to the user in a way that visually separates the AB1 meaning from the AB2 meaning, for example by using a bold line to separate them or by different background colors.

The following exemplary pseudocode demonstrates novel processing steps that may be employed in generating suggested completions:

---
ALGORITHM DISPLAY_SEARCH_SUGGESTIONS
---

```
INPUT: SEARCH_TERM, KNOWLEDGE_BASE
OUTPUT: Display of SEARCH_SUGGESTIONS
BEGIN
   NODE_COLLECTION = { }
   FOR EACH NODE IN KNOWLEDGE_BASE
     IF NODE contains SEARCH_TERM
       NODE_COLLECTION = NODE_COLLECTION ∪{NODE}
   /* NODE_COLLECTION now contains all homonyms */
   ITH_SUGGESTION = 1
   IF size_of(NODE_COLLECTION) > 4
     NODE_COLLECTION =
     MOST_COMMON(NODE_COLLECTION)
   /* NODE_COLLECTION now contains at most 4 homonyms */
   FOR EACH NODE IN NODE_COLLECTION
     NEIGHBOR_LIST = { }
     FOR N IN NEIGHBORS_PLUS_GRANDPAR(NODE)
       /* We add one additional level in the IS-A
          hierarchy to the immediate neighbors. */
       NEIGHBOR_LIST = NEIGHBOR_LIST ∪ {<REL, N>}
     /* Pairs of all neighbors and their connecting
        relationships are collected in a list. */
     PRIOR_LIST = PRIORITIZE(NEIGHBOR_LIST)
     /* Pairs with important relationships, such as
        IS-A are placed first in the list. */
     SEARCH_SUGGESTIONS[ITH_SUGGESTION] =
     PRIOR_LIST
     ITH_SUGGESTION++
   SEARCH_SUGGESTIONS =
   LIMIT_SIZE(SEARCH_SUGGESTIONS)
   /* At most 12 lines are displayed over all
      homonyms. */
```

---
ALGORITHM DISPLAY_SEARCH_SUGGESTIONS
---

```
   DISPLAY_WITH_SEPARATORS(SEARCH_SUGGESTIONS)
   /* Suggestions for each homonym are displayed,
      visually separated from each other. */
END
```

The algorithm DISPLAY_SEARCH_SUGGESTIONS fuses the following sub-algorithms: MOST_COMMON returns a plurality of homonyms. The MOST_COMMON sub-algorithm in this example returns a maximum of four homonyms. This selection is done based on the number of hit counts for each homonym. These hit counts may be recorded in the ontology during creation time.

The NEIGHBORS_PLUS_GRANDPAR sub-algorithm returns for every instance in the ontology all neighboring nodes that are one link away from it, plus the "grand parent," i.e., the IS-A parent of the class of which it is an instance.

The PRIORITIZE sub-algorithm sorts the list of neighbors by importance. In this example the importance is determined by the types of connecting relationships. Thus IS-A relationships to parent classes are considered more important than lateral semantic relationships. If several neighbors are connected by the same relationship type, then the order of the connected concepts is chosen arbitrarily for said embodiment.

The LIMIT_SIZE sub-algorithm in this example controls the total size of the output. In order to avoid overloading the user with information and in order to achieve a behavior similar to existing search engines, the total number of search suggestions displayed is limited to between about 4 and about 50. In another embodiment the total number of search suggestions displayed is limited to a maximum of 12. The number 12 is divisible by 2, 3, and 4, which makes it a good choice for 2, 3, or 4 homonyms. Furthermore, 12 is considered not overwhelming for a human user.

The sub-algorithm DISPLAY_WITH_SEPARATORS in this example creates the actual dropdown box that is shown to the user. It contains the computed search suggestions with appropriate separators to express the semantic distances between them.

At least one embodiment of the present invention is referred to herein as an Ontology-Supported Web Search (OSWS) system. An OSWS for "famous people" utilizing one embodiment of the present invention provides search suggestions based on the user input every time the user types a new character. As seen in the example of FIG. 4, after the user completes the search term "Martina," the system finds all the famous people in the knowledge base with "Martina" in their names. Additional background information about these famous people is extracted from the knowledge base for generating suggested completions. In this example, the tennis players Martina Hingis and Martina Navratilova and the singer Martina McBride are found. From the information related to these three famous people the suggested completions in the dropdown box are generated and displayed to the user.

For each concept of a famous person of the same name, all immediate neighbors along with the connecting relationships are retrieved from the ontologies. The first proposed suggestion about a famous person is based on the class (modeling the occupation) of the person, which defines the name of the domain to which the person belongs. For instance, Martina Hingis has the first suggested completion "Martina Hingis tennis player" and Martina McBride has the first suggested completion "Martina McBride singer." Subsequently, the remaining suggestions about each famous person are constructed based on the knowledge retrieved from the ontologies. The suggestions may include the background information of a person like the date of birth and the place of birth, and sometimes the birth name. As a non-limiting example, the ontology related to musicians stores the genres of music the artist performs. For athletes, the league and the team he or she belongs to are represented in the ontology. For instance, in FIG. 4, from the suggested completions the user could learn that Martina McBride plays country music, adult contemporary music, and country pop music, which she may not have been aware of.

In one embodiment, different famous individuals with the name Martina are separated by horizontal lines and background colors. The separation clearly expresses the fact that there are conceptual distances among the homonyms expressed by different sets of suggested completions. This unique feature of one embodiment of the present invention makes it easier for the user to learn or remember that she is dealing with a homonym. The state of the art at present does not support such a separation. In fact, the visual display of FIG. 4 illustrates the fact that Martina Hingis is conceptually closer to Martina Navratilova (both tennis players) than to Martina McBride (the singer) by applying separating lines of different thickness.

Besides the separating lines, the background color design in the dropdown box also distinguishes famous people from different domains. For example, as shown in FIG. 4, the suggestions for the two tennis players are generated by the system with a blue background, in contrast to the suggested completions of the singer that are displayed with a pink background. It will be apparent to the skilled artisan that different background colors may be used for each homonym for which suggested completions may be displayed. In this example, four preselected background colors are used for the four homonyms for which suggested completions may be displayed. Four are not considered overwhelming for a human user.

After the user chooses one suggestion that fits her search needs and clicks the search button, such as a "Google Search" button, she will be led to the result page of a "normal" search, such as a Google® search result page. For purposes of illustration only, Google® functionalities are mimicked by having the "I'm Feeling Lucky" button, which will lead directly to the Web page with the highest Google® ranking. It will be apparent to the skilled artisan that the presently disclosed subject matter may interface and operate with any popular search engine. In fact the disclosed subject matter can be implemented on any search engine present or future that contains an application programming interface (API).

In one embodiment, to avoid overwhelming the user with too many suggestions, and to simulate the Google® look and feel of the interface, the system may be set up to show up to a maximum of 12 suggestions for a maximum of four famous people homonyms. However, it will be recognized the system may be set up to show any number of suggestions.

As described herein, potentially, there may be too many suggested continuations for one concept, and a selection process may be desirable. In accordance with one embodiment, the selection of lines for one homonym is achieved by assigning different priorities to different relationship types. For example, the IS-A link to the domain name (occupation) may be considered to have the highest priority. For musicians, the genres of music they play have higher priorities than their dates of birth and places of birth. For basketball players, the team and league they play in are treated as more important than their birth information. Thus, the high priority suggestions are shown if there is more knowledge in an ontology than available space in the dropdown box. For example, now referring to FIG. 5, 12 suggestions are shown in the search box by eliminating the date of birth and place of birth information of the singer Michael Jackson, since these have the lowest assigned priorities.

If there are more than four homonyms (such as the over 20 Michael Jacksons), in one embodiment, four (or another suitable number) may be chosen based on certain criteria. There are two approaches for this selection process. In one embodiment, selection criterion is related to the amount of information available in the ontologies about each sense. Thus, senses with a large amount of attached knowledge should be preferred over other senses. This is based on the pragmatic assumption that system implementers would not make the effort of including a large amount of information about a concept in an ontology if that concept is considered unimportant. However, this selection approach requires mature ontologies covering many domains with rich knowledge. While such ontologies do not always exist, and it is still a big challenge to build them, the disclosed selection approach may be implemented when they do exist.

In the absence of sufficiently complete ontologies, a second approach may be employed. In one embodiment, a possible criterion to select the most popular homonyms is by using hit count estimates for a search engine of choice such as Google®. This particular embodiment assumes that people with higher hit count estimates are more popular and famous. For instance, the query "Michael Jackson singer" returns almost twice the number of Web pages than the query "Michael Jackson basketball." Thus, Michael Jackson the singer should be preferred over the others. The representation of three homonymous "Michael Jacksons" in the knowledge base can be seen in FIG. 5.

Figure 6:
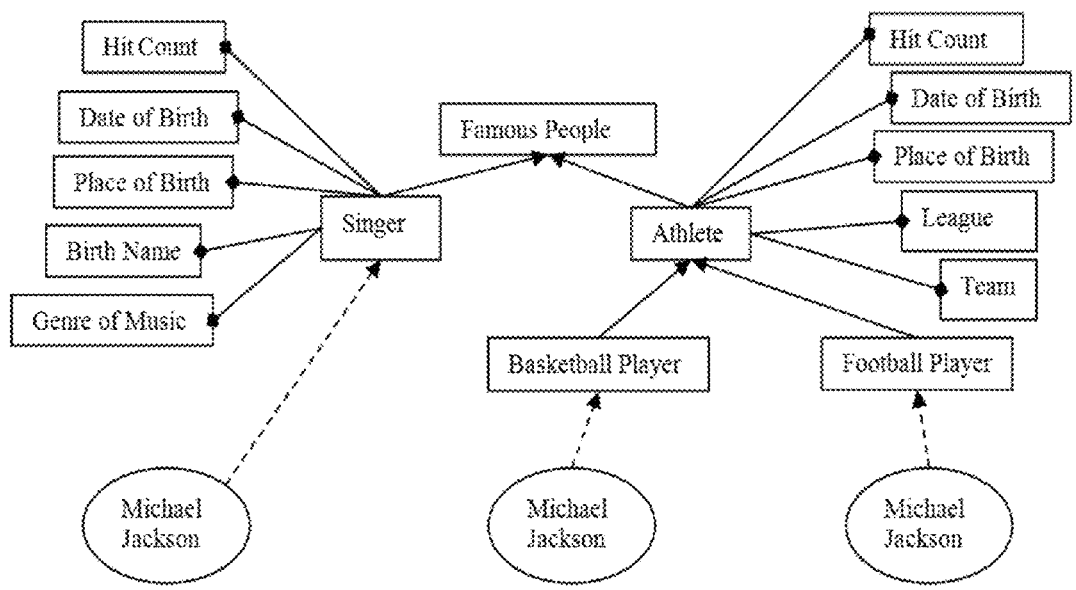
FIG. 6 is a chart indicating classes, instances, IS-A links, semantic relationships other than IS-A and instances of relationships, and the relationships therebetween, that may be employed in accordance with one or more further aspects of the present invention.

Now referring to FIG. 6, classes are represented as boxes. Instances are shown as ellipses. IS-A links are drawn as arrows from the child class to the parent class. Dashed arrows connect instances to the classes of which that they are instances. Finally, lines terminated by small black squares indicate semantic relationships other than IS-A and instance of relationships. As an example the Google® hit count estimates are collected and assigned to the appropriate instances of famous people while building the musician and basketball player ontologies. Thus, this information is available before the user starts with her search. However, this solution has several disadvantages. Hit counts are not stable. For example, after the singer Michael Jackson's untimely death, the number of hits greatly increased. Thus the previously mentioned ontology-size-based criterion embodiment may be preferable.

The suggested completions in the search box change dynamically after every single input character, just as in Google®. The response time is near instantaneous, limited more by the typing speed of the user than by the response time of the system. Exemplary embodiments of current ontologies utilized by the systems disclosed herein contain semantic information about more than 5000 musicians, more than 3000 basketball players and a sampling of sportsmen in other domains.

Figure 7:
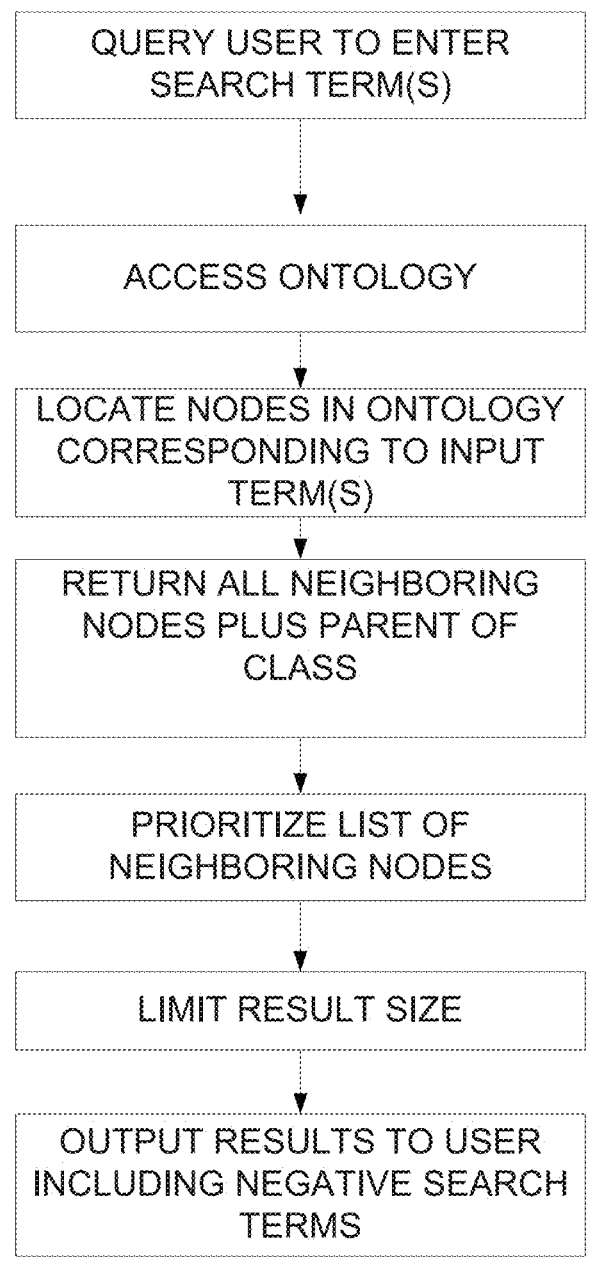
FIG. 7 is a flow diagram indicating alternative and/or additional process steps that may be carried out in accordance with one or more further aspects of the present invention.

Now referring to FIG. 7, a method is disclosed for improving search suggestion results using negative search terms. In general the steps outlined in FIG. 3 are employed but the output displays negative results to a user.

Using negative search terms is akin to mutual inhibition as it occurs in neural networks. If different neurons compete for achieving maximum activation, they inhibit neighboring neurons. This should be seen only as a metaphor, not as a technical model, as there are vast differences between the numeric approach of a neural network and the symbolic approach of an ontology. Based on this metaphor, if the user types in Michael Jackson and the ontology knows about Michael Jackson the singer and Michael Jackson the basketball player, then two useful suggested completions would be:

Michael Jackson Singer—Basketball

Michael Jackson Basketball—Singer

In both of these suggested completions, a bold font is used to indicate the words that have been entered by the user. Thus, neighbors of a node that are used as positive search terms for one homonym may be introduced as negative search terms for the other homonym. None of the major existing search engines suggest completions with negative search terms to the users.

Many search engine users appear to be unfamiliar with the meaning of a minus sign (−) in front of a search word. Thus, suggesting a completion with a minus sign is syntactically unsatisfactory. Rather, the above completions may appear as:

Michael Jackson Basketball [but not] Singer

Michael Jackson Singer [but not] Basketball

Probably the biggest problem with all ontology-based approaches is from where to obtain, or take, the necessary ontologies. Developing them in-house is time consuming and person-hour and/or budget intensive. Wide-scale ontology reuse has still not materialized, even though the Semantic Web (Lee, T. B., Hendler, J., Lassila, O., The Semantic Web. In: Scientific American Magazine. (2001)) ontology search engines such as Swoogle (Ding, L., Finin, T., Joshi, A., Pan, R., Cost, R. S., Swoogle: A Search and Metadata Engine for the Semantic Web. In: Proceedings of the thirteenth ACM international conference on Information and knowledge management, pp 652-659ACM Press (2004)) and ontology repositories (Ontology Design Patterns (ODP), http://ontologydesignpatterns.org/wiki/Main_Page; Open Biological and Biomedical Ontologies (OBO), http://www.obofoundry.org/) have attempted to solve this problem. Many approaches to automatically generate or extend ontologies have met with partial success but have also not reached the state of "shrink wrapped" solutions.

Ontology Building Systems and Methods

The ontologies used in the examples above consisted of information on U.S. musicians and athletes. This ontology was constructed by programmatically extracting data, such as genres for musicians and leagues for athletes, from Wikipedia and as such is limited. As discussed in further detail hereinbelow, method for building an extended ontology, such as one of famous people, is provided. The exemplary ontology disclosed herein covers over 3200 famous persons including artists, athletes, politicians, scientists, and others. This ontology is dynamically expanded during use.

Accordingly, methods are disclosed for building an ontology which includes mining suggested completions from a search engine and extracting additional information from a database such as DBpedia (DBpedia, http://dbpedia.org/About, retrieved Apr. 20, 2011). Also disclosed are processes of expanding an ontology dynamically during the normal operation of a system.

Figure 8:
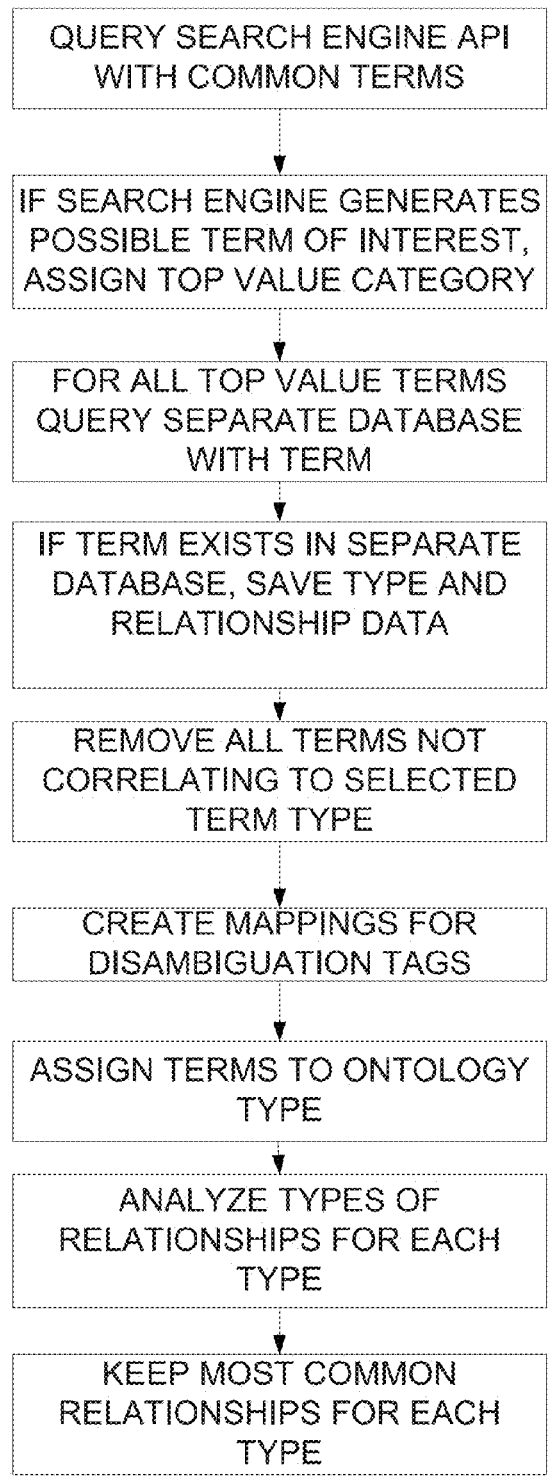
FIG. 8 is a flow diagram indicating certain process steps that may be carried out for building an ontology in accordance with one or more further aspects of the present invention.

Now referring to FIG. 8, in one embodiment a method of building an ontology includes querying a search engine API with common terms, extracting from the results generated by the search engine terms of interest, assigning the terms of interest to a top value category, querying a separate database with the term(s), saving type and relationship data for term(s) found in the separate database, removing all terms not correlated to the selected term type, creating mappings for disambiguation tags, assigning terms to an ontology type, analyzing the types of relationships for each type, and retaining the most common relationships for each type.

In one embodiment the method includes updating the ontology periodically. Online news feeds may be employed to provide continuous updating.

In another embodiment, instead of using hit counts to determine the display sequence of the homonyms, the total number of relationships emanating from a given instance may be used. The assumption is that the more relationships an instance has, the more popular the person is, since there is more information about this person.

In another embodiment, the manner in which search suggestions are generated may be based on the lack of certain relationship information from an instance, rather than the presence of such relationship. If a relationship is within a class's domain, but a given instance does not have any target for it, the system may provide a search suggestion in the form of [Instance Name] [Relationship Name]. For example, the system displays the suggestion "Kurt Cobain song," even though there is no song information for Kurt Cobain stored in the ontology (as there is no song information in DBpedia for Kurt Cobain). This search suggestion still might improve the search results, as the relationship name itself is likely to exist in relevant Web pages. This method is best applied to class-specific relationships, to avoid using relationships with low discriminative power that apply to all people.

Search suggestions are preferably displayed with more user-friendly versions of the relationship names than stored in the ontology. For example, a relationship in the ontology is named "starsInFilm" but the user sees "stars in film." The same method is also preferably used for class names. This more verbose form of search suggestions distances the end-user from the underlying structure of the ontology and provides information he or she is more likely to understand.

EXAMPLES

A method for building an extended ontology of famous people was developed. A predicate question was "Who is famous?" To answer the question Google was queried and about 3200 people that are currently famous in the USA were revealed by selectively mining Google's suggested completions. The search engines' public interface was used, however, query logs could be used if available.

To collect a wider range of information about these mined famous people, we used the already-structured knowledge of DBpedia instead of the mostly text-based Wikipedia. DBpedia is a knowledge base that stores structured data extracted from Wikipedia, and is accessible on the Web. The DBpedia knowledge base currently describes more than 3.5 million entities, including 364,000 persons. DBpedia is considered one of the largest multi-domain ontologies currently in existence. Compared to other hand-crafted ontologies, however, DBpedia is less formally structured. Also, the data quality is lower and there are inconsistencies within DBpedia. The goal was to build an ontology with well defined classifications and a sufficient amount of useful relationship information to serve the purposes of the OSWS system.

In summary, we extracted useful information about famous people (as determined by mining Google), extracted information about the famous people from DBpedia, organized the information as well structured data, and stored it in the ontology of famous people, which could then be used used in systems disclosed herein (the OSWS system). We used the publicly available DBpedia SPARQL interface, in addition to the Google Autocomplete SOAP API.

Building an Ontology of Famous People

The systems disclosed herein are generally designed to provide disambiguated search suggestions; therefore the ontology employed should contain data useful for such a purpose. To expand the domain of the ontology we used the already well-structured data of DBpedia. We could not use the DBpedia ontology "out of the box." There were many types of relationships not relevant to the purposes of the ontology of the disclosed systems, redundant relationships (multiple "artist of" relationship types), frequent data errors, as well as inconsistent representations of information (what is an attribute, as opposed to a relationship). To integrate knowledge from DBpedia into the systems disclosed herein we extracted subsets of information from their ontology that are compatible for use within the system. For purposes of this example it was decided to mainly incorporate relationships from people classes to other relevant target classes, such as movies starred in, songs produced, sports teams played on, etc. This afford a fine granularity for describing people but also provides useful classifications for other classes they are related to.

Determining Who is Famous

Using publicly available US census data, we extracted the top 1000 male and female first names (the most common first names in the US) from the year 2000 census data. These names were passed to Google, one by one, and the Google responses were recorded by our program. For example, the mining program passed the first name Robert to Google and then extracted the last names Frost, Pattinson, DeNiro, Half and Downey Jr. as people that Google knows are famous right now. We collected the returned results and looked for the ones of the form "$n_1\ n_2\ n_3$", where $n_1$ is the person's first name, $n_2$ is the optional middle initial, and $n_3$ is the last name. We checked the last names against the 5000 most common last names from the US census database. With this method, we mined 5286 potentially famous people from Google. We designated these people as members of the "A-List," as they are the search suggestions returned by entering only a first name. We repeated this process with "$n_1\ l_1$" style queries, where $n_1$ is a first name from the census data and $l_1$ is a letter from the alphabet. This type of query further refines the suggestions by potentially including a specific middle initial or the start of a last name. We named the results from this set of queries the B-List, and it is comprised of 132,896 candidates. Finally, our program queried the search engine with a series of inputs of the format "$n_1\ l_1 l_2$", where $l_1$ and $l_2$ are letters in the alphabet, and mined the returned names, storing them as the C-List, composed of nearly a million potentially famous people.

As many properly formatted suggestions were clearly not referring to people (for example, Sterling Silver, Joseph A. Bank, John J. College), we next had to identify which names correlated to an actual person. For this purpose, our program passed the 5286 names in the A-List to DBpedia to determine for each name whether it refers to one or several people. Our program analyzed the type and Wikipedia subject data stored within DBpedia to make this determination. For example, if a given DBpedia page contained the type "ontology:person" or "yago:person," the program considered this a valid person. Similarly, if the name belonged to the Wikipedia category "Living people" or belonged to Wikipedia categories that end in "Births" or "Deaths," i.e. "1986 births," it considered the name to be that of a real person. Using this method, we identified 3241 famous people among the names in the A-List.

Classification of the Famous People

The ontology was based on the person hierarchy within the DBpedia ontology. The DBpedia ontology is built from data stored on Wikipedia pages. It forms a shallow subsumption hierarchy. Specifically, DBpedia uses the "Infoboxes" which are included on many Wikipedia pages. Infoboxes are tables of attribute-value pairs that are located on the top right-hand side of these Wikipedia pages. These boxes have specific types associated with them, such as "Actor infobox" or "MusicalArtist infobox." DBpedia's ontology is built using these Infobox types as class names, and a page with a specific type of Infobox is assigned that type. For example, Tom Hanks has an Actor infobox, and he is an instance of the class "Actor" in the DBpedia ontology. This structure (shown in Table 1) was adequate for providing the appropriate granularity for use within the systems of the present disclosure. Protégé was used as the ontology editing tool.

The ontology was built by extracting the complete "Person" hierarchy from the DBpedia ontology, and manually adding several other non-person hierarchies. The non-person classes were selected based on the necessity of using them as targets for relationships emanating from the person classes. Once the names of the A-List were extracted and correlated with real people, instances were inserted corresponding to them into the ontology for the system.

In using the DBpedia ontology, in some cases within the A-List a number of people were found to exist in Wikipedia but did not have DBpedia ontology classes associated therewith. While the DBpedia ontology contains over 360,000 categorized people, and continues to expand, there was still a significant number missing, amounting to approximately 520 (17%). A number of ways to augment the DBpedia ontology were employed to expand the domain coverage. For example, for each correlated name in the A-List we mapped it to a class within the hierarchy. In cases wherein the DBpedia class was very general and thus uninformative, such as "Person," we provided more specific classes for these concepts.

TABLE 1

Partial "Person" hierarchy in the DBpedia ontology, in Protégé

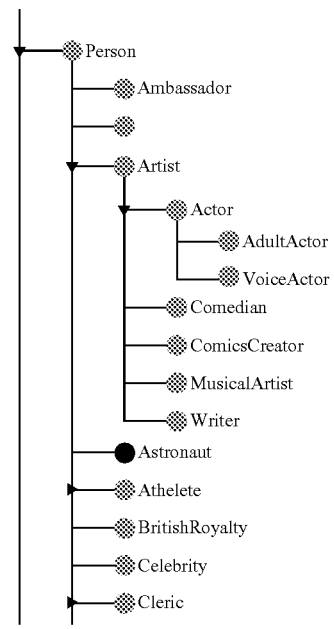

TABLE 1-continued

Partial "Person" hierarchy in the DBpedia ontology, in Protégé

- CollegeCoach
- Criminal
- FictionalCharacter
- Journalist
- Judge
- MilitaryPerson
- Model
- Monarch
- OfficeHolder
- Philosopher
- PlayboyPlaymate
- PokerPlayer
- Politician
- Scientist
- SoccerManager

...

Mapping from YAGO to DBpedia Ontology

YAGO (Yet Another Great Ontology) is an ontology built from Wikipedia leaf categories mapped to WordNet synsets ("synonym sets"). Because of the way the YAGO ontology was built, instances often belong to many classes. The DBpedia ontology provides such mappings to YAGO, and other ontologies. We first collected the DBpedia ontology types and YAGO "rdf:types" for all pages correlated to a name in the A-List.

The YAGO types found in this way were often far too specific for mapping (e.g., "AmericanDanceMusicians"). Types that are too specific defeat the purpose of a classification, as they are unlikely to occur in a Web search and likely to have very few instances. Thus, we went to their broader types ("Musician" in this case), which provided a more useful class name. With programmed string matching, we were able to match about 40 YAGO classes to DBpedia classes.

Additionally, we used the approximately 450 pages which existed in both DBpedia and YAGO to perform a statistical analysis and map YAGO classes to DBpedia classes. For example, if a certain percentage of pages with the DBpedia ontology type "MusicalArtist" had the YAGO types "Singer" or "Soprano," we would map both to the DBpedia class "MusicalArtist." Finally, we sorted through a small number of the YAGO classes by hand and mapped them to DBpedia classes. In total we mapped 85 of the most commonly found YAGO classes to DBpedia classes. A sample of YAGO types to DBpedia ontology mappings can be seen in Table 2. Most mappings are either identical (Actor to Actor) or include more specific YAGO types mapped to less specific DBpedia types. It will be apparent to the skilled artisan the Person hierarchy may be mapped with the YAGO types which appear most frequently, in order to provide more specific classifications for people.

TABLE 2

A SAMPLE OF YAGO TO DBPEDIA ONTOLOGY MAPPINGS

| YAGO Class Name | DBpedia Ontology Mapping |
| --- | --- |
| Actor | Actor |
| Anthropologist | Scientist |
| Biologist | Scientist |
| Biographer | Writer |
| Blogger | Writer |
| Drummer | MusicalArtist |
| Guitarist | MusicalArtist |
| Admiral | MilitaryPerson |
| Marine | MilitaryPerson |
| Singer | MusicalArtist |

For each page with a set of YAGO classes, we determined the more general YAGO classes and used our mappings to find the DBpedia class for each YAGO class on the page. We then counted the occurrences of each DBpedia class and selected the one with the maximum number of occurrences as the correct mapping class. For example, the YAGO ontology classes for Kurt Cobain are "American Diarists," "Grunge Musicians," "Musicians From Washington (U.S. State)," "American Musicians Of Irish Descent," and "People From Olympia, Washington," among others. The more general classes are "Diarist," "Musician," "Musician," "Musician," and "Person," respectively. Our exemplary mapping system mapped "Diarist" to "Writer," "Musician" to "MusicalArtist," and "Person" to "Person" in the DBpedia ontology. In the above example, Kurt Cobain has one mapping to the class "Writer," three to the class "MusicalArtist," and one to "Person." The program chose the most common mapping, in this case "MusicalArtist," and assigned the instance, in this case Kurt Cobain, to that class.

Using instances in the A-List that have both YAGO and DBpedia ontology types, this method resulted in the same classification for 268 out of 401 (67%) instances. Additionally, this mapping system determined a more specific class for 47 people (12%) who were classified as "Person" in the DBpedia ontology. Many other mappings were less specific than the DBpedia ontology type given (such as being mapped to "Athlete" instead of "Wrestler"), but still usable.

Mapping from Disambiguation Tags to DBpedia Ontology

A large number of pages not categorized by the DBpedia ontology were homonyms of more famous people with the same name, such as Michael Jackson the anthropologist, who is classified as a "thing" in the DBpedia ontology. As homonyms are a common occurrence in their data, Wikipedia handles homonyms by adding a "disambiguation tag" to the end of a page name. For example, there are a number of Michael Jordans in Wikipedia. One Michael Jordan, the famous basketball player, has a page name of "Michael_Jordan." Other Michael Jordans have page names such as "Michael_Jordan_(footballer)" and "Michael_Jordan (Irish_politician)," a soccer player and a politician respectively.

We took advantage of the information between the parentheses and constructed a set of mappings from disambiguation tags to DBpedia classes. We were able to map 50 of the most commonly occurring tags. Many disambiguation tags are in the form of [type]_born_[year] (for example "Footballer_born_1984") or [nationality]_[type] (for example "American_singer"). By matching the type to a mapped tag, we were able to correctly categorize many pages based on their disambiguation tags. Out of 233 people in the A-List who had no DBpedia class and a disambiguation tag, we were able to map 118 people (51%) into the exemplary ontology using the 50 most common tags. By adding more mappings we were able to increase this to close to 100%.

Mapping from Wikipedia Abstracts to DBpedia Ontology

Whenever we were not able to identify a person's type using any of the previously discussed methods, we resorted to the following approach. A Wikipedia abstract is the paragraph that appears at the top of a Wikipedia page. Many of the abstracts of person pages start in the form of "someone is/was something," which introduces the occupation of the person. For example, basketball player Michael Jordan has his Wikipedia page introduction starting with "Michael Jeffrey Jordan is a former American professional basketball player."

After analyzing the abstract of a page and extracting the occupation information, we checked the occupation against our list of class names. Whenever there was a match between the occupation and a class, we assigned the person to that class. In the example above, Michael Jeffrey Jordan was determined to be a basketball player by finding basketball player in the abstract and matching it to the "BasketballPlayer" class in the ontology. Many abstracts have a list of occupations separated by commas or "and." For example, Martin Scorsese's occupations are "American film director, screenwriter, producer, actor, and film historian." For this research, we only considered the first class that we were able to match.

Using the described method, we were able to add 248 new instances out of 473 previously unidentified people into the exemplary ontology. In a random sample of 50 of these instances, we manually compared their disambiguation tags with the mapped DBpedia classes and found that 44 (88%) of the instances were matched correctly. All errors in this sample set were due to the way we check occupations against classes. For example, "Martial Artist" was matched to the class "Artist," and "Personality" was matched to the class "Person." One skilled in the art will recognize that using a more advanced method of string matching or natural language processing would greatly increase not only accuracy, but also coverage of this method.

Choosing the Best Classification

To summarize the above four methods for classifying famous people in DBpedia, we choose the classification of a famous person as follows. For each name in the A-List, we retrieved the DBpedia ontology class, YAGO classes, disambiguation tag, and abstract, whenever each existed. While mapping, we give equal weight to the DBpedia class, the mappings from YAGO, and the disambiguation tag. In the event that there are multiple possible mappings, we choose the class that is lowest in the hierarchy (the most specific class) and assign the instance to that class. In the event that no DBpedia class, YAGO class and disambiguation tag exist for a person, we resort to using the abstract to classify the person.

Structuring the Relationships and the Attributes

DBpedia contains a rich set of relationships within its ontology, however for search suggestions many of them are not helpful for end-users. Additionally, information is often not organized well enough for use in search suggestions. We used the existing relationship data derived from DBpedia for our ontology, but we had to restructure it for use in the OSWS search suggestions.

Identifying Possible Relationships and Attributes

After assigning each of over 3241 people within the A-List to an appropriate class, we proceeded to query DBpedia for the types of relationships each instance possessed. We calculated how often each relationship or attribute appeared, relative to its class. This is shown in (1), where Nr stands for the total number of people in a given class with a particular relationship, while N is the total number of people belonging to the class. Relationships and attributes that appear most often were more likely to be useful in the ontology. Thus we defined a threshold p as a criterion for selecting useful relationships.

$$\frac{Nr}{N} > p \quad (1)$$

In practice, 50% appeared to be a good value for p. We manually excluded common relationships that were not useful for search results, such as "subject" (Wikipedia category), "label," and others. Finally, we performed a manual review of the remaining 213 relationships and attributes to make sure they made sense for their assigned classes.

Organizing the Relationships and Attributes

One problem with the DBpedia data is that there are often redundant relationships, for example Actors that have the relationships "dbprop:starring" and "dbpedia-owl:starring," which we treated as having the same meaning.

A second issue is that some relationships in DBpedia are lacking in granularity or have multiple meanings. For example, the relationship "writer" can mean writer of a book, movie, song, or television show. The context of a relationship often depends on the class of the source. To distinguish between these semi-ambiguous relationships, we split many DBpedia relationships into two or more relationships in the subject ontology. This was done by analyzing the parent classes of the targets that a relationship points to. When a large number of targets are of a few different classes (for example, if 30% of the targets for the "writer" relationship are movies and 40% of the targets are television shows) we selected this relationship as a candidate for splitting. In total we split up the five relationships that had the greatest variety of targets with close distributions. They are the relationships "starring," "writer," "produced," "genre," and "musical artist of." These five relationships were split into 15 disambiguated relationships. One example is the "starring" relationship, which links a person to a movie or television show. We replaced it with the "stars in television show" and "stars in film" relationships and used one or the other depending on the type of the target in DBpedia.

For each relationship that was introduced into the ontology, we identified the type of the target in DBpedia in two ways. One way was to retrieve the parent class of the target in the DBpedia ontology, the other was to identify the corresponding Wikipedia subject categories. For example, if DBpedia contains "Forest Gump starring Tom Hanks," while adding this relationship to our ontology, the program determines that Forest Gump is assigned the DBpedia class "Film." Knowing that Forest Gump is a film, we introduced the relationship "Tom Hanks stars in film Forest Gump" into the ontology.

We switched the subject and object in many relationships that exist in DBpedia, which corresponds to using the inverse relationship. It is common in DBpedia to see relationships for actors and musicians in the form of [Movie] starring [Actor] or [Song] performed by [Musician]. For example, the actor Tom Hanks is the target of the relationship "Forrest Gump starring Tom Hanks" Since the ontology is person-focused, we reversed these relationships to make the person the subject of the relationship. Thus, in the ontology the relationships would be [Actor] stars in [Movie] and [Musician] performs song [Song]. As for the above example, we changed the relationship "Forrest Gump starring Tom Hanks" to "Tom Hanks stars in Forrest Gump."

In the above process, the design choice was made to promote certain DBpedia attributes to full relationships, such as the instruments played by a musician and the comedic genres for comedians. By promoting these attributes to relationships to other classes we were able to more explicitly show a linking of instances, such as two musicians playing the same instrument(s). There are cases where attributes are represented as a comma separated list of terms in DBpedia. For example, if one musician plays piano and keyboard, his or her instrument attributes would be listed as "piano, keyboard." In the described cases we break the attribute apart at the commas and make each resulting token its own instance.

For non-interpersonal relationships (where the source is a person but the target is not) we organized the targets in a shallow hierarchy based on the DBpedia ontology. We removed all unnecessary classes in the DBpedia ontology (those that are not targets of any relationships) and augmented the ontology with a number of new classes.

For interpersonal relationships a problem that had to be addressed was how to handle targets that did not exist in our ontology. Recursively loading all information for each target would rapidly cover a large percentage of DBpedia, filling up the ontology with knowledge irrelevant to the task at hand. This would also run counter to the idea of only storing famous people in the ontology. A person related to a famous person is not automatically famous, although she might be famous in her own right, e.g., as is the case for Bill and Hillary Clinton.

The solution to this problem was the introduction of "stub" instances for such persons. Like other target instances in our exemplary ontology, stubs include only a name and an assigned class. This prevents the recursion problem while still including those instances within the ontology. If a stub is later determined to represent a famous person, it will be promoted to a full instance and relationship data for it will be loaded into the ontology. Stubs only containing this minimum of information are not returned as search suggestions by the OSWS system.

Building the Ontology of Famous People

We utilized the Protégé Java API to build the exemplary ontology programmatically. First we built the class hierarchy and determined the required relationships. Then, for each name in the A-List, we identified its parent class and inserted the corresponding instance. For each instance included, our program queried DBpedia for the necessary relationship and attribute information. For each valid relationship, the target was added as a "stub" instance if it did not yet exist. This resulted in an ontology consisting of 3241 people instances and over 60,000 relationships emanating from them.

Figure 9:
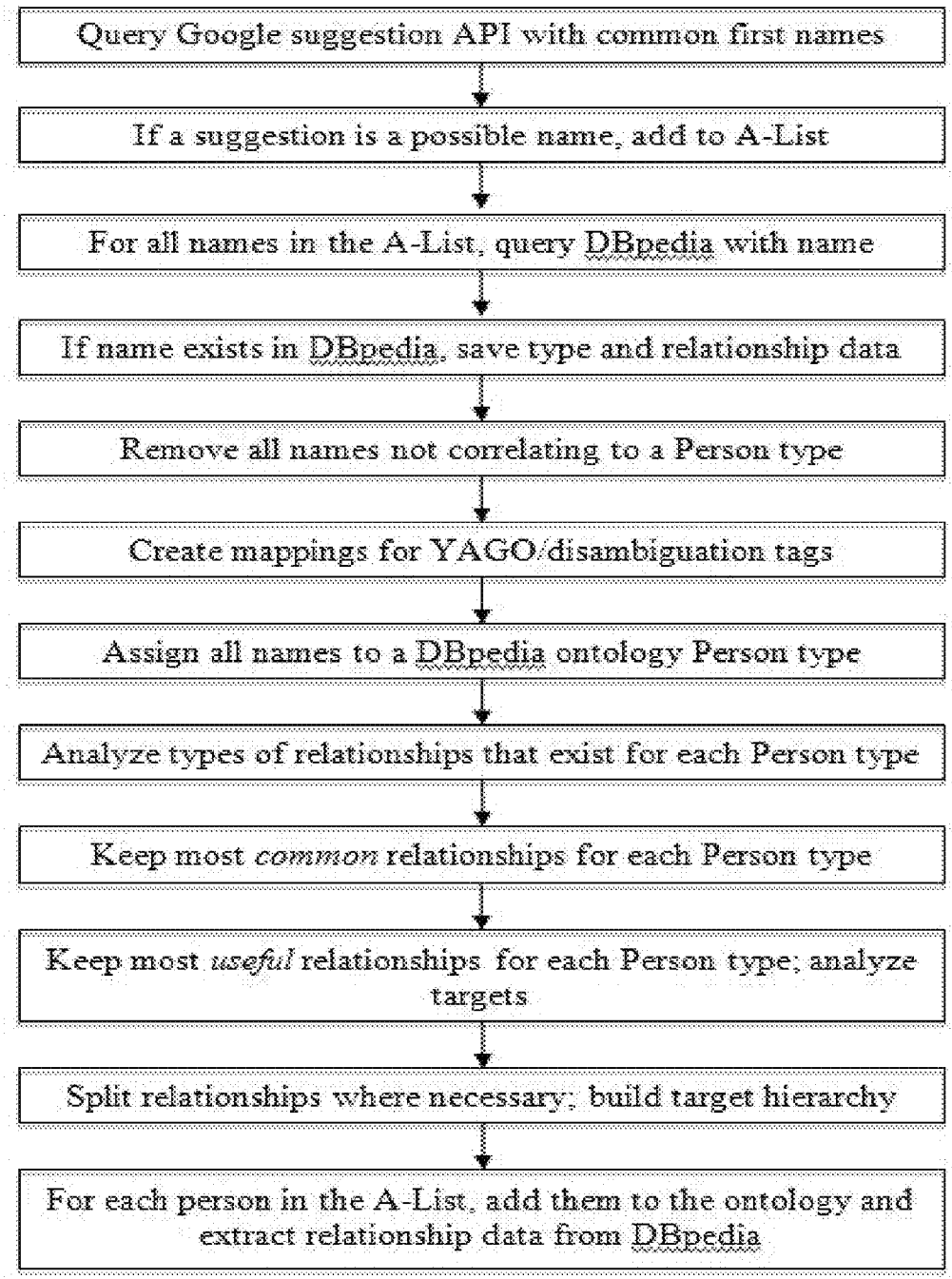
FIG. 9 is a flow diagram indicating alternative and/or additional process steps that maybe carried out for building an ontology in accordance with one or more aspects of the present invention.

Finally, this greatly improved ontology was reintegrated into the OSWS front end. The OSWS system includes a number of user friendly features, such as displaying longer versions of relationship and class names, class-specific relationships being displayed first, and the ability to filter by class name. The work flow of building the exemplary famous people ontology is illustrated in FIG. 9.

Dynamically Expanding the Ontology of Famous People

With a few exceptions, there are two general approaches to ontology development: automatically generated, covering a large domain, or hand crafted, covering a relatively small domain. This is due to the great difficulty of building an ontology by hand. Both approaches have disadvantages. Ontologies like DBpedia and YAGO fall into the former category. Information stored in these ontologies is generally less well organized and often not reliable when compared to smaller, hand crafted ontologies. On the other hand, hand-crafted ontologies are often too small to be practical.

While the exemplary A-List ontology discussed above covered about 3200 of the most famous people according to Google (as queried in the Northeast of the USA), it is apparent that users' search interests change on a regular basis. Who is popular and who is not often changes overnight. Keeping an ontology of famous people up-to-date would require significant time and effort if done by hand. To address this difficult issue, systems and methods are disclosed herein which combine features of automatically generated ontologies and hand-crafted ontologies. The presently disclosed systems automatically keep the ontology instances up-to-date.

Figure 10:
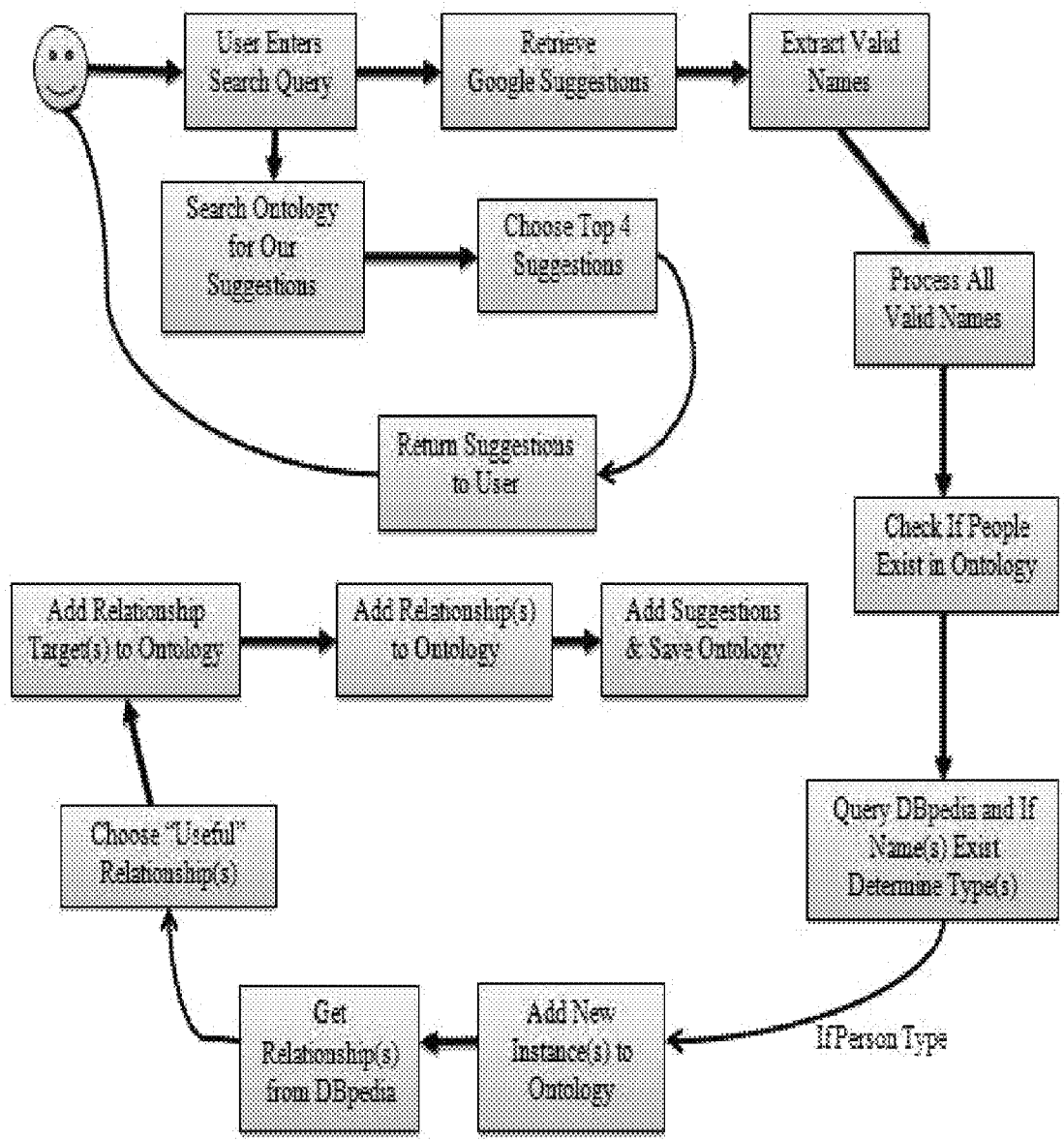
FIG. 10 is a flow diagram indicating process steps for dynamically expanding an ontology based on user searches in accordance with one or more further aspects of the present invention.

Now referring to FIG. 10, a method is disclosed for dynamically expanding an ontology based on user searches. A name or fragment thereof is received by a server running an ontology supported web search as disclosed herein. The name or fragment may be entered by a user. Upon receiving the name or fragment, the system processes same in two parallel threads. In one thread, which may called the expansion thread, the system passes the query on to a search engine which provides suggested search queries (such as Google) and retrieves the suggested search queries via its SOAP API. The expansion system then checks the suggested completions generated by the search engine for valid names, using census data for common names for example. The system then queries another database (such as Dbpedia) and determines whether any of the possible names correlate to an actual person. If a name correlates to an actual person then the program determines whether he or she already exists in the ontology. If this is not the case, the system running the program attempts to determine the correct class and creates a new instance of it in the ontology.

If the instance exists in the ontology, but only as a stub, it is promoted to a full instance and then treated in the same way as a new instance. Using the relationships identified previously, the other database (such as Dbpedia) is queried for applicable relationships and targets. If a given target does not exist in the ontology, a new instance for the target is created before including the relationship. Once the instance has been fully created within the ontology, it is added to the list of valid suggestions. The list of valid suggestions may be generated by the server so that it is viewable by a user. The list may be provided to a user along with any other previously existing instances that may qualify as search suggestions.

The expansion system ensures that the ontology supported web search systems disclosed herein remain up-to-date with search suggestions, and the domain of the ontology expands without the need for input from the developers.

In one embodiment the method is employed in an ontology supported webs search system as disclosed herein.

In one embodiment, the method and system may only add a person to the ontology who has been the topic of several queries. This addresses problems that may arise as a result of a single user who might be looking for his uncle, not a famous person.

The expansion systems and methods herein may be employed to enhance search engines, such as Google. For example, once information has been extracted from Google into a system as disclosed herein, the server generates and can present the user with search suggestions, as always, but distinguished according to homonyms. This service is not provided by Google.

To maintain a reasonably fast response time, the expansion system may run as a background task.

Example

Using the A-List as a "training set," we developed an expansion system to dynamically expand the OSWS ontology based on user searches performed with the OSWS interface. By plugging the various programs developed for building the A-List ontology into the OSWS front end, we devised a way of expanding the ontology with no input from the developers and minimal input of the end-users.

The expansion system generally works by analyzing user search queries and then including people who are commonly searched for into the ontology. It will be apparent the expansion system could be used to extract information on the over 360,000 people covered in the DBpedia ontology, or from another database, in addition to other people not covered by the DBpedia ontology, this much knowledge could overwhelm users. If users of the system were to query for all of the people within the DBpedia ontology, the coverage of the OSWS system ontology would eventually converge with DBpedia. It is in the nature of being famous that relatively few people are famous at the same time, therefore too many results would be self-defeating. Thus, for purposes of the present example, the focus was on providing suggestions only for people who our users consider worthy searching for. Furthermore, it is not practical to have potentially hundreds of possible search suggestions for each entered query.

We ran an evaluation experiment of the ontology expansion system. Three independent users were selected to perform in total 100 Web searches for famous people using the OSWS system. Among the 100 input queries, 34 of them already existed in the ontology, thus, their suggested completions were retrieved immediately from the ontology. Another 59 taken from the user queries, did not exist in the ontology and were automatically added.

The remaining seven people had associated Google suggestions but were not found in DBpedia. However, in all seven cases a correct individual existed in DBpedia. In some cases the problem was due to the use of non-ASCII characters. For example, the Spanish name Jose Luis Rodríguez Zapatero was not matched due to the letter "e" with an accent on top of it. The most common error was not handling "redirects" in DBpedia. For example, Franklin Roosevelt was not found in DBpedia, because he was stored as Franklin D. Roosevelt. However, there is a DBpedia resource named Franklin Roosevelt which redirects to Franklin D. Roosevelt. DBpedia uses this redirect system to handle variations in names.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

REFERENCES

1. Radev, D. R., Fan, W., Zhang, Z.: WebInEssence: A Personalized Web-Based Multi-Document Summarization and Recommendation System. In: NAACL Workshop on Automatic Summarization. Pittsburgh, Pa. (2001)
2. An, Y., Chun, S., Huang, K., Geller, J: Enriching Ontology for Deep Web Search. In: DEXA, vol. 5181, pp 73-80. Lecture Notes in Computer Science. Turin, Italy (2008)
3. Google Query Suggestion, http://www.google.com/support/websearch/bin/answer.py?hl=en&answer=106230
4. Yahoo Search Assistant, http://tools.search.yahoo.com/newsearch/searchassist.html
5. Bing Search Suggestions, http://help.live.com/help.aspx?project=w1_searchv1&querytype=keyword&query=tseggusotua&mkt=en-US
6. An, Y., Geller, J., Wu, Y., Chun, S: Semantic Deep Web: Automatic Attribute Extraction from the Deep Web Data Sources. In: Proceedings of the 2007 ACM Symposium on Applied computing, pp 1667-1672. ACM-SAC, Seoul, Korea (2007)
7. An, Y., Chun, S., Huang, K., Geller, J.: Assessment for Ontology-Supported Deep Web Search. In: 2008 10th IEEE Conference on E-Commerce Technology and the Fifth IEEE Conference on Enterprise Computing, E-Commerce and E-Services, pp 382-388. IEEE Computer Society (2008)
8. Tian, T., Geller, J., Chun, S. A.: Predicting Web Search Hit Counts. WIC, Toronto, Canada, accepted for Publication (2010)
9. Lee, T. B., Hendler, J., Lassila, O.: The Semantic Web. In: Scientific American Magazine. (2001)
10. Ding, L., Finin, T., Joshi, A., Pan, R., Cost, R. S.: Swoogle: A Search and Metadata Engine for the Semantic Web. In: Proceedings of the thirteenth ACM international conference on Information and knowledge management, pp 652-659. ACM Press (2004)
11. Ontology Design Patterns (ODP), http://ontologydesign-patterns.org/wiki/Main_Page
12. Open Biological and Biomedical Ontologies (OBO), http://www.obofoundry.org/
13. Niles, L., Pease, A.: Towards a standard upper ontology. In: Proceedings of the international conference on Formal Ontology in Information System, pp 2-9. ACM, New York (2001)
14. Sowa, J. F.: Knowledge Representation: Logical, Philosophical, and Computational Foundations. Brooks Cole Publishing Co., Pacific Grove, Calif. (2000)

What is claimed is:

1. A computer-implemented method of providing suggested completions to search engine results, comprising executing on a processor the steps of:
   receiving at a server at least one search term;
   locating nodes in an ontology stored in a memory associated with the server, wherein nodes consist of classes or instances of information, that correspond to the at least one search term;
   retrieving at least one neighbor and/or extended neighbor of each of two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationship and wherein extended neighbors of an instance are classes which are reachable as parent or ancestors from the class to which the instance belongs, class properties and data type properties of the class to which the instance belongs;
   retrieving first a parent or ancestor for each node which is a class;
   for each node which is an instance, retrieving first the class of which it is an instance or at least one of its ancestors;
   optionally, limiting the retrieved information to a subset; and generating suggested completions in a format using at least one visually distinguishing feature that may be presented to a user, wherein
the method comprises using an ontology built according to the steps of querying a search engine with common terms;
extracting at least one term of interest from results generated by the search engine;
assigning the at least one term of interest to a top value category;
querying a separate database with the at least one term;
saving type and relationship data for term(s) found in the separate database;
removing all terms not correlated to the selected term type;
creating mappings for disambiguation tags;
assigning terms to an ontology type,
analyzing the types of relationships for each type, and
retaining the most common relationships for each type.

2. The method according to claim 1 wherein the step of optionally limiting the retrieved information to a subset comprises eliminating neighbors that are common to more than one sense of a search term.

3. The method according to claim 1 comprising providing a suggested completion using information of the node when only a single node is located.

4. The method according to claim 1 wherein the format of suggested completions comprises separating different homonymic terms by at least one visually distinguishing feature selected from horizontal or vertical lines, zig-zag lines, dashes, dots, and/or background colors.

5. The method according to claim 1 comprising showing a maximum of six to eighteen suggestions for a maximum of two to six homonymic terms.

6. The method according to claim 1 comprising employing selection criteria to limit the number of homonymic terms to four.

7. The method according to claim 6 wherein a selection criteria is a hit count estimate from a search engine.

8. The method according to claim 1 comprising using neighbors of a node that are used as positive search terms for one homonymic term as a negative search terms for another homonymic term.

9. An apparatus, including a processor operating to perform actions in response to executing computer program instructions, the actions comprising:
providing suggested completions to search engine results comprising receiving at a server at least one search term;
locating nodes in a stored ontology, wherein nodes consist of classes or instances of information, that correspond to the at least one search term;
retrieving at least one neighbor and/or extended neighbor of each of two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationship and wherein extended neighbors of an instance are classes which are reachable as parent or ancestors from the class to which the instance belongs, class properties and data type properties of the class to which the instance belongs;
retrieving first a parent or ancestor for each node which is a class;
for each node which is an instance, retrieving first the class of which it is an instance or at least one of its ancestors;
optionally, limiting the retrieved information to a subset; and
generating suggested completions in a format using at least one visually distinguishing feature that may be presented to a user; wherein the apparatus uses an ontology built according to the steps of querying a search engine with common terms;
extracting at least one term of interest from results generated by the search engine;
assigning the at least one term of interest to a top value category;
querying a separate database with the at least one term;
saving type and relationship data for term(s) found in the separate database;
removing all terms not correlated to the selected term type;
creating mappings for disambiguation tags;
assigning terms to an ontology type,
analyzing the types of relationships for each type, and
retaining the most common relationships for each type.

10. The apparatus according to claim 9 comprising using neighbors of a node that are used as positive search terms for one homonymic term as a negative search terms for another homonymic term.

11. A non-transitory, computer readable storage medium containing a computer program, which when executed by a computer processor causes the computer processor to perform actions, the actions comprising:
providing suggested completions to search engine results comprising receiving at a server at least one search term;
locating nodes in a stored ontology, wherein nodes consist of classes or instances of information, that correspond to the at least one search term;
retrieving at least one neighbor and/or extended neighbor of each of two or more located nodes in the stored ontology, wherein neighbors of a class comprise parent classes, child classes and classes that are reachable from a class by traversing a semantic relationship, and wherein neighbors of an instance are the class to which the instance belongs, object properties and data type properties of the instance; wherein extended neighbors of a class comprise ancestor classes, descendant classes and classes that are reachable from a class by traversing a path of at least one semantic relationship followed by another semantic relationship and wherein extended neighbors of an instance are classes which are reachable as parent or ancestors from the class to which the instance belongs, class properties and data type properties of the class to which the instance belongs;
retrieving first a parent or ancestor for each node which is a class;
for each node which is an instance, retrieving first the class of which it is an instance or at least one of its ancestors;
optionally, limiting the retrieved information to a subset; and
generating suggested completions in a format using at least one visually distinguishing feature that may be presented to a user,
wherein the non-transitory, computer readable storage medium uses an ontology built according to the steps of querying a search engine with common terms;
extracting at least one term of interest from results generated by the search engine;

assigning the al least one term of interest to a top value category;
querying a separate database with the at least one term;
saving type and relationship data for term(s) found in the separate database;
removing all terms not correlated to the selected term type;
creating mappings for disambiguation tags;
assigning terms to an ontology type,
analyzing the types of relationships for each type, and
retaining the most common relationships for each type.

12. The apparatus according to claim 11 comprising using neighbors of a node that are used as positive search terms for one homonymic term as a negative search terms for another homonymic term.

* * * * *